United States Patent
Doi et al.

(10) Patent No.: US 8,797,466 B2
(45) Date of Patent: Aug. 5, 2014

(54) LIQUID CRYSTAL DISPLAY

(75) Inventors: Takashi Doi, Kanazawa (JP); Toshihiro Ninomiya, Nonoichi (JP); Kazuya Kiuchi, Nonoichi (JP)

(73) Assignee: Japan Display Inc., Tokyo (JP)

( * ) Notice: Subject to any disclaimer, the term of this patent is extended or adjusted under 35 U.S.C. 154(b) by 124 days.

(21) Appl. No.: 13/525,683

(22) Filed: Jun. 18, 2012

(65) Prior Publication Data

US 2012/0327353 A1    Dec. 27, 2012

(30) Foreign Application Priority Data

Jun. 22, 2011  (JP) ................................. 2011-138386

(51) Int. Cl.
   *G02F 1/1333* (2006.01)
(52) U.S. Cl.
   USPC .......................................................... 349/12
(58) Field of Classification Search
   CPC .................................................. G02F 1/13339
   USPC .......................................................... 349/12
   See application file for complete search history.

(56) References Cited

U.S. PATENT DOCUMENTS

| 7,173,681 | B2 | 2/2007 | Takahashi et al. |
| 7,859,521 | B2 * | 12/2010 | Hotelling et al. ............. 345/173 |
| 2010/0002178 | A1 | 1/2010 | Ninomiya et al. |

FOREIGN PATENT DOCUMENTS

JP    2010-231773    10/2010

OTHER PUBLICATIONS

U.S. Appl. No. 13/487,476, filed Jun. 4, 2012, Doi, et al.

* cited by examiner

*Primary Examiner* — James Dudek
(74) *Attorney, Agent, or Firm* — Oblon, Spivak, McClelland, Maier & Neustadt, L.L.P.

(57) ABSTRACT

According to one embodiment, a liquid crystal display includes a display region including a plurality of display pixels arrayed in a matrix, an array substrate including a plurality of first electrodes which are arrayed in a matrix, a plurality of first sensors which extend in a column direction on the first electrodes, and a plurality of second sensors which extend in a row direction substantially perpendicular to the column direction and are electrically connected to the first sensors, a countersubstrate which is arranged to face the array substrate, and a liquid crystal layer which is interposed between the array substrate and the countersubstrate. The first sensors include omitted portions which connect adjacent regions surrounded by the first sensors and the second sensors.

18 Claims, 5 Drawing Sheets

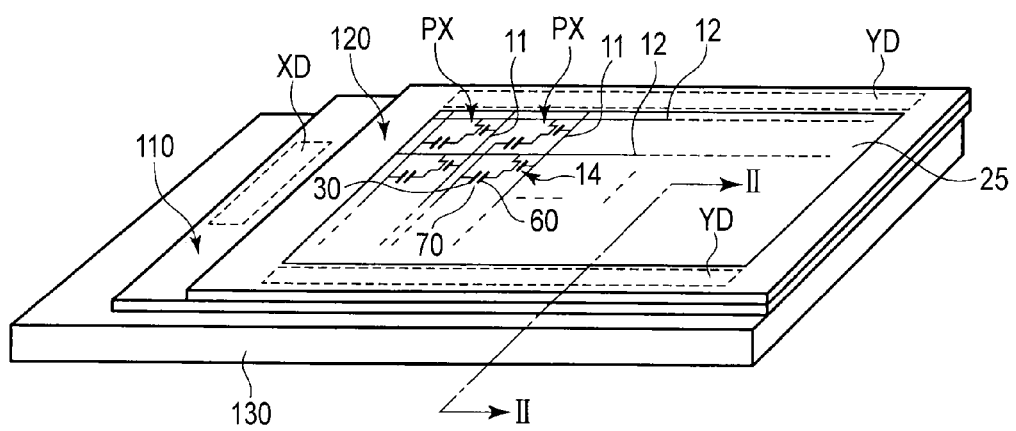
F I G. 1

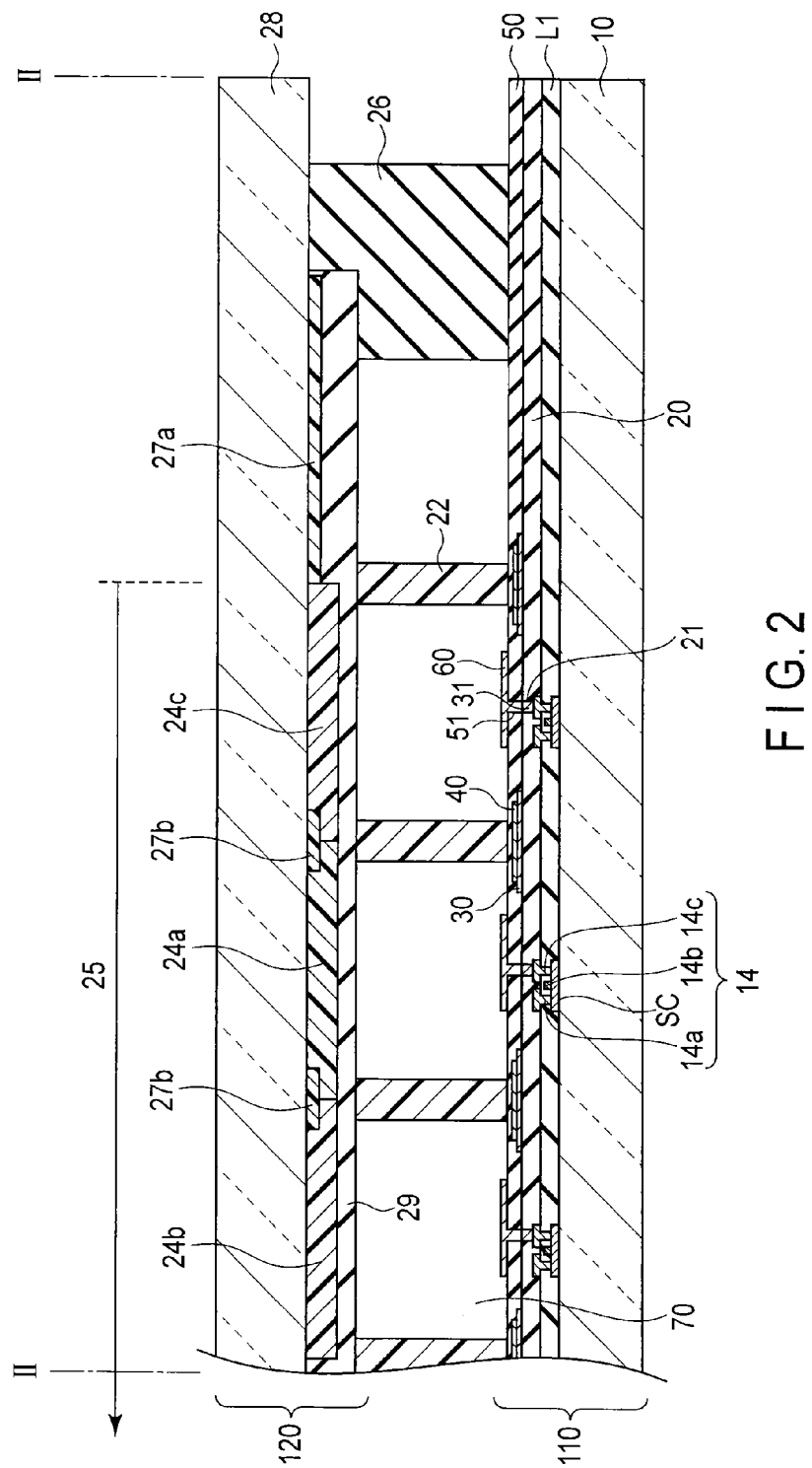
F I G. 2

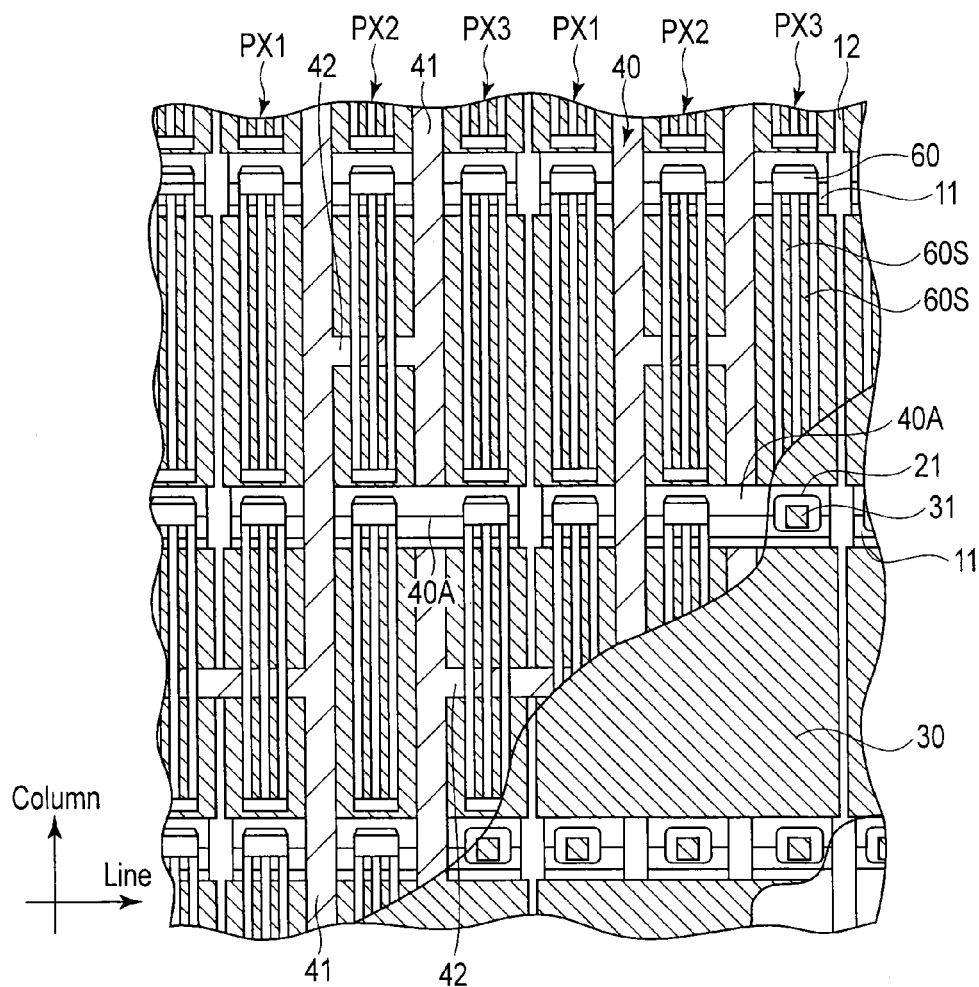
F I G. 3

LIQUID CRYSTAL DISPLAY

CROSS-REFERENCE TO RELATED APPLICATIONS

This application is based upon and claims the benefit of priority from prior Japanese Patent Application No. 2011-138386, filed Jun. 22, 2011, the entire contents of which are incorporated herein by reference.

FIELD

Embodiments described herein relate generally to a liquid crystal display.

BACKGROUND

Flat display apparatuses are currently undergoing active development, particularly liquid crystal displays, which are finding application in various fields by dint of such desirable features as lightness, thinness, and low energy consumption. A liquid crystal display is realized by confining a liquid crystal layer between paired substrates, the display producing an image as a result of the modulation factor of light passing through the liquid crystal layer being controlled in accordance with an electric field between a pixel electrode and a common electrode.

For liquid crystal displays, there are known a method of controlling the liquid crystal alignment state by applying, to the liquid crystal layer, a longitudinal electric field in a direction almost perpendicular to the substrate surfaces of the paired substrates, and a method of controlling the liquid crystal alignment state by applying, to the liquid crystal layer, a transverse electric field (including even a fringe electric field) in a direction almost parallel to the surfaces of the paired substrates.

A liquid crystal display using a transverse electric field especially receives attention in terms of a wider view angle. A transverse electric field liquid crystal display in the in-plane switching (IPS) mode, fringe field switching (FFS) mode, or the like includes pixel electrodes and common electrodes formed on an array substrate. Liquid crystal molecules are switched by a transverse electric field almost parallel to the major surface of the array substrate.

There is also proposed a liquid crystal display including a touch sensor which detects that a user's fingertip or a stylus tip has touched the display unit. The touch sensor is formed by further superposing a sensor substrate including sensor electrodes on the display unit of the liquid crystal display or integrally forming sensor electrodes on one of paired substrates of the liquid crystal display.

BRIEF DESCRIPTION OF THE DRAWINGS

FIG. 1 is a perspective view schematically showing an example of a liquid crystal display according to an embodiment;

FIG. 2 is a sectional view showing an example of the section of the liquid crystal display panel shown in FIG. 1 taken along a line II-II;

FIG. 3 is a plan view schematically showing an example of the arrangement of sensor electrodes arranged in the display region of the liquid crystal display according to the embodiment;

DETAILED DESCRIPTION

Figure 4:
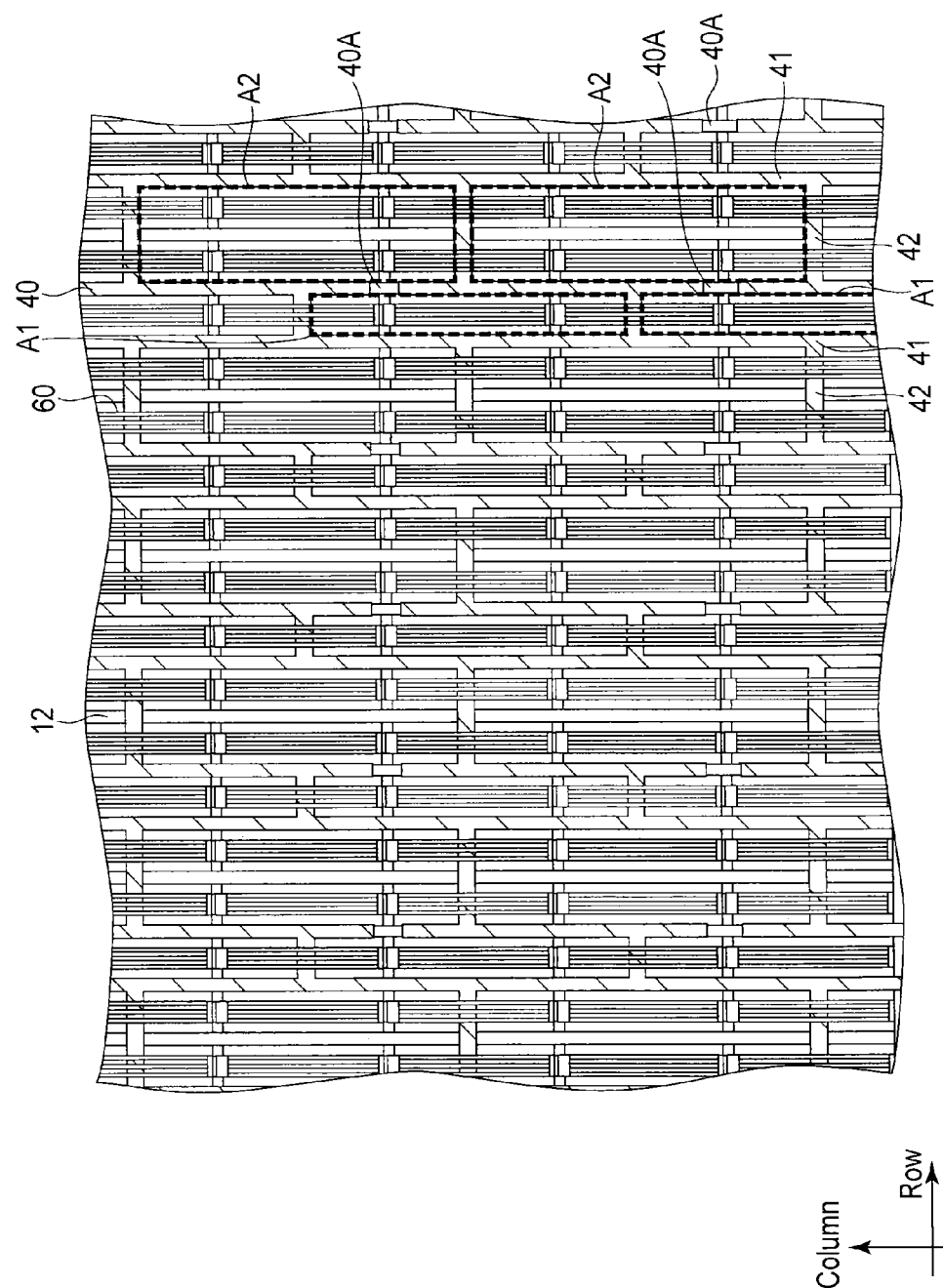
FIG. 4 is a plan view schematically showing an example of the arrangement of the display region of the liquid crystal display according to the embodiment.

In general, according to one embodiment, a liquid crystal display comprising: a display region including a plurality of display pixels arrayed in a matrix; an array substrate including a plurality of first electrodes which are arrayed in a matrix, a plurality of first sensors which extend in a column direction on the first electrodes, and a plurality of second sensors which extend in a row direction substantially perpendicular to the column direction and are electrically connected to the first sensors; a countersubstrate which is arranged to face the array substrate; and a liquid crystal layer which is interposed between the array substrate and the countersubstrate. The first sensors include omitted portions which connect adjacent regions surrounded by the first sensors and the second sensors.

A liquid crystal display according to an embodiment will now be described with reference to the drawings.

FIG. 1 schematically shows an example of the liquid crystal display according to the embodiment. The liquid crystal display includes a liquid crystal display panel including an array substrate 110, a countersubstrate 120 which is arranged to face the array substrate 110 at a predetermined interval, a liquid crystal layer 70 (FIG. 2) interposed between the array substrate 110 and the countersubstrate 120, and a display region 25 including display pixels PX arrayed in a matrix, and a backlight unit 130 which illuminates the liquid crystal display panel from the back.

FIG. 2 shows an example of the section of the liquid crystal display panel shown in FIG. 1 taken along a line II-II. The liquid crystal display according to the embodiment is a liquid crystal display in the FFS mode in which the alignment state of the liquid crystal layer is controlled using a transverse electric field.

The array substrate 110 includes a transparent insulating substrate 10 of glass or the like, pixel driving interconnections arranged on the transparent insulating substrate 10, switching elements 14, insulating films L1 and 50, a planarization film 20, common electrodes (first electrodes) 30, sensor electrodes (second electrodes) 40, pixel electrodes (third electrodes) 60, an alignment film (not shown), and a driving circuit. The pixel driving interconnections include scanning lines 11 running in a row direction (second direction) in which the plurality of display pixels PX are arrayed, and signal lines 12 running in a column direction (first direction) in which the plurality of display pixels PX are arrayed.

The driving circuit includes scanning line driving circuits YD which are arranged in a frame region around the display region 25 and drive the plurality of scanning lines 11, and a signal line driving circuit XD which drives the plurality of signal lines 12.

The scanning line driving circuits YD are arranged on two sides of the display region 25 in a direction in which the scanning lines 11 run. The plurality of scanning lines 11 running from the display region 25 are electrically connected to the scanning line driving circuits YD. The plurality of signal lines 12 running from the display region 25 are electrically connected to the signal line driving circuit XD.

A flexible board (not shown) is connected to the end of the array substrate 110. A control signal and video signal are supplied from a signal source (not shown) to the scanning line driving circuits YD and signal line driving circuit XD via the flexible board.

The scanning lines 11 run along the rows of the display pixels PX arrayed in a matrix in the display region 25. The signal lines 12 run along the columns of the display pixels PX arrayed in a matrix in the display region 25.

Each switching element 14 is arranged near a position where the scanning line 11 and signal line 12 cross each other. The switching element 14 is arranged on an undercoat layer (not shown) arranged on the transparent insulating substrate 10. The switching element 14 includes a thin-film transistor including an amorphous silicon or polysilicon semiconductor layer SC, gate electrode 14b, source electrode 14a, and drain electrode 14c.

A gate insulating film is arranged on the semiconductor layer SC of the switching element 14. The gate electrode 14b of the switching element 14 is arranged on the gate insulating film. The source electrode 14a and drain electrode 14c of the switching element 14 are connected to the semiconductor layer SC in a contact hole formed in the insulating film L1.

The gate electrode 14b of the switching element 14 is electrically connected to (or formed integrally with) the corresponding scanning line 11. The source electrode 14a of the switching element 14 is electrically connected to (or formed integrally with) the corresponding signal line 12. The drain electrode 14c of the switching element is electrically connected to the corresponding pixel electrode 60 in contact holes 21 and 51 (described later).

The scanning line driving circuit YD drives the scanning line 11 to apply a voltage to the gate electrode 14b of the switching element 14. Then, the source electrode 14a and drain electrode 14c are rendered conductive to turn on the switching element 14 for a predetermined period. While the switching element 14 is on, a video signal is supplied from the signal line 12 to the pixel electrode 60 via the switching element 14.

The planarization film 20 is arranged on the switching element 14. In the embodiment, the planarization film 20 is a transparent organic insulating film, and the film thickness of the planarization film 20 is approximately 3 μm. The planarization film 20 is arranged in the entire display region 25 except for the contact holes 21. The contact hole 21 is formed in the planarization film 20 on the drain electrode 14c of the switching element 14 to electrically connect the pixel electrode 60 (described later). The common electrodes 30 are arranged on the planarization film 20.

FIG. 3 shows an example of the arrangement of the display region 25 of the array substrate 110. In FIG. 3, the pixel electrodes 60 and sensor electrodes 40 are partially omitted to represent the shape of the common electrodes 30.

In a color-display-type liquid crystal display, the plurality of display pixels PX include color pixels PX1, PX2, and PX3 of a plurality of types. In the embodiment, the plurality of display pixels PX include, for example, red display pixels for displaying red, green display pixels for displaying green, and blue display pixels for displaying blue. In this case, one picture element is formed from color pixels of the three types, that is, red, green, and blue display pixels.

In the display region 25, the first color pixels PX1, second color pixels PX2, and third color pixels PX3 are periodically aligned in a direction in which the scanning lines 11 run, and color pixels of the same type are aligned in a direction in which the signal lines 12 run.

The common electrode 30 is a conductive oxide film (first conductive oxide film) consisting of a transparent electrode material such as indium tin oxide (ITO) or indium zinc oxide (IZO). The common electrodes 30 arranged at the end of the display region 25 extend to the frame region, and receive a common voltage from, for example, an external signal source via the flexible board.

The common electrodes 30 are formed using the same pattern by taking account of the overlay accuracy with the sensor electrodes 40 (described later). More specifically, the common electrodes 30 are arrayed in a matrix to face the plurality of pixel electrodes 60. Each common electrode 30 is arranged to face three pixel electrodes 60 arranged in one picture element.

A connection electrode 31 of the same material as the common electrode 30 is arranged in each contact hole 21. The drain electrode 14c of the switching element 14 and the connection electrode 31 are electrically connected in the contact hole 21.

FIG. 4 is a plan view for explaining an example of the arrangement of the sensor electrodes 40 arranged in the display region 25. In FIG. 4, broken lines represent the pattern shapes of the pixel electrodes 60, scanning lines 11, and signal lines 12. The sensor electrodes 40 are arranged on the common electrodes 30, and electrically connected to the common electrodes 30. The sensor electrode 40 is, for example, a multilayered electrode of aluminum and molybdenum.

The sensor electrodes 40 include first sensors 41 serving as first sensor electrodes extending almost parallel to the signal lines 12, and second sensors 42 serving as second sensor electrodes extending almost parallel to the scanning lines 11. In the embodiment, the first sensor 41 is arranged on the signal line 12 between predetermined two color pixels out of the first color pixel PX1, second color pixel PX2, and third color pixel PX3 which form one picture element. In other words, the first sensors 41 are interposed between the plurality of pixel electrodes facing a common electrode.

For example, in the embodiment, the first sensors 41 are interposed between the first color pixel PX1 and the second color pixel PX2, and between the second color pixel PX2 and the third color pixel PX3.

The first sensor 41 interposed between the second color pixel PX2 and the third color pixel PX3 includes an omitted portion 40A. The first sensor 41 interposed between the first color pixel PX1 and the second color pixel PX2 does not include the omitted portion 40A. In the row direction, the first sensors 41 each including the omitted portion 40A and the first sensors 41 each including no omitted portion 40A are alternately aligned.

The omitted portion 40A is formed at a position where the scanning line 11 and signal line 12 cross each other. First regions A1 surrounded by the sensor electrodes 40 in the second color pixels PX2, and second regions A2 surrounded by the sensor electrodes 40 in the first color pixels PX1 and third color pixels PX3 are connected to each other at the omitted portions 40A.

The second sensor 42 is arranged below the pixel electrode 60 (described later), and electrically connects the first sensors 41 adjacent to each other in the row direction. The second sensors 42 are arranged in every other display pixel PX among the plurality of display pixels PX aligned in the column direction. The second sensors 42 arranged in the columns of the display pixels PX adjacent to each other in the row direction electrically connect the first sensors 41 at different positions in the column direction. In the embodiment, rows of the display pixels PX in which the second sensors 42 are arranged in the second color pixels PX2, and rows of the display pixels PX in which the second sensors 42 are arranged in the first color pixels PX1 and third color pixels PX3 are alternately aligned in a direction in which the signal lines 12 run.

The sensor electrodes 40 extend to the frame region, and are electrically connected to, for example, an external sensor circuit (not shown). When detecting a touch position on the liquid crystal display according to the embodiment, the sensor circuit supplies a signal of a predetermined waveform to the sensor electrode 40. The magnitude of a capacitance generated between the user's fingertip or a stylus tip and the sensor electrode 40 changes depending on the distance between the fingertip or the like and the sensor electrode 40. The sensor circuit detects, from the output waveform of a signal output from the sensor electrode 40, a change in potential of the sensor electrode 40 upon the change in capacitance between the fingertip or the like and the sensor electrode 40, thereby detecting a coordinate position of the sensor electrode 40 that corresponds to the position touched with the fingertip of the user, stylus tip, or the like.

The insulating film 50 is arranged on the sensor electrodes 40. The insulating film 50 includes the contact holes 51 each for electrically connecting the pixel electrode 60 and connection electrode 31.

The pixel electrodes 60 are arranged on the insulating film 50, and electrically connected to the connection electrodes 31 in the contact holes 51. The pixel electrode 60 is a conductive oxide film (second conductive oxide film) consisting of a transparent electrode material such as ITO or IZO. The alignment film (not shown) is arranged on the pixel electrodes 60.

As shown in FIG. 3, the pixel electrode 60 includes slits 60S extending almost parallel to each other. In the embodiment, the plurality of slits 60S extend almost parallel to a direction in which the signal lines 12 run.

The alignment state of the liquid crystal layer 70 is controlled by an electric field generated between the pixel electrode 60 and the common electrode 30 or between the end of the pixel electrode 60 and the sensor electrode 40. By forming the slits 60S in the pixel electrode 60, an electric field is generated between the pixel electrode 60 and the common electrode 30 even at the center of the display pixel PX, and the alignment state of the liquid crystal layer 70 can be controlled.

The countersubstrate 120 includes a transparent insulating substrate 28 of glass or the like, a transparent resin planarization film 29, a plurality of colored layers, and an alignment film (not shown).

The plurality of colored layers are organic insulating films, and include a first colored layer 24a, second colored layer 24b, and third colored layer 24c each of which is colored with a resist of one of red (R), green (G), and blue (B), and a fourth colored layer 27a and fifth colored layers 27b in black.

The first colored layer 24a is arranged in the first color pixel PX1, the second colored layer 24b is arranged in the second color pixel PX2, and the third colored layer 24c is arranged in the third color pixel PX3. The fourth colored layer 27a is a light shielding layer which is arranged around the display region 25 and prevents transmission of light in the frame region. The fifth colored layers 27b are light shielding layers which are arrayed in a matrix at positions where they face the scanning lines 11 and signal lines 12 of the array substrate 110, and prevent transmission of light between the display pixels PX.

The array substrate 110 and countersubstrate 120 are arranged so that their alignment films face each other, and are fixed by a sealing agent 26. Columnar spacers 22 are interposed between the array substrate 110 and the countersubstrate 120. The columnar spacers 22 keep constant the distance between the array substrate 110 and the countersubstrate 120. In the embodiment, the height of the columnar spacer 22 is arbitrarily controlled to fall within a range of 2 to 6 µm.

The liquid crystal layer 70 is arranged in a region defined by the array substrate 110, countersubstrate 120, and sealing agent 26.

Polarizing plates (not shown) are respectively arranged on surfaces of the array substrate 110 and countersubstrate 120 that are opposite to the liquid crystal layer 70.

Next, a method of manufacturing the liquid crystal display according to the embodiment will be exemplified.

First, a method of forming the array substrate 110 will be explained. Film formation and patterning are repeated on the first transparent insulating substrate for cutting out a plurality of array substrates 110, thereby forming switching elements 14, scanning lines 11, signal lines 12, an insulating film L1, and other switching elements and various interconnections on the array substrate 110.

Then, an exposure resist is applied, exposed, and developed, yielding a planarization film 20 in the form of a transparent organic insulating film. At this time, the exposure resist is applied to the entire display region 25 and frame region. The embodiment employs a photocurable exposure resist. The photoresist is exposed via an exposure mask, developed, and formed into a planarization film 20 of a predetermined pattern having contact holes 21.

A transparent electrode material such as ITO is formed on the planarization film 20, and an exposure resist is further applied to the transparent electrode material. The exposure resist is exposed, developed, and patterned into a predetermined pattern of the connection electrodes 31 and common electrodes 30. The transparent electrode material is patterned by etching, and the exposure resist is removed, forming the common electrodes 30 of the predetermined pattern.

Film formation of molybdenum, film formation of aluminum, and film formation of molybdenum are sequentially performed on the common electrodes 30. An exposure resist is applied, exposed, and developed, and the molybdenum/aluminum/molybdenum metal multilayer is patterned by wet etching. As a result, the sensor electrodes 40 of an electrode pattern having a multilayered structure of aluminum and molybdenum are formed on first electrodes 30A and second electrodes 30B of the common electrodes 30.

At this time, wet etching is used in order not to roughen the surface of the planarization film 20 in the form of an organic insulating film. In other words, dry etching damages the surface of the planarization film 20. To prevent this, wet etching is selected in the process of forming the sensor electrodes 40.

When forming a conductive layer on a substrate and patterning it by wet etching, if a non-omitted portion surrounded by the conductive layer exists, gas generated upon etching readily stays in the region surrounded by the conductive layer, and an etching error may occur. For example, if an etching error occurs in the opening of a display pixel, light may be cut off, decreasing the transmittance and degrading the display quality.

Figure 5:
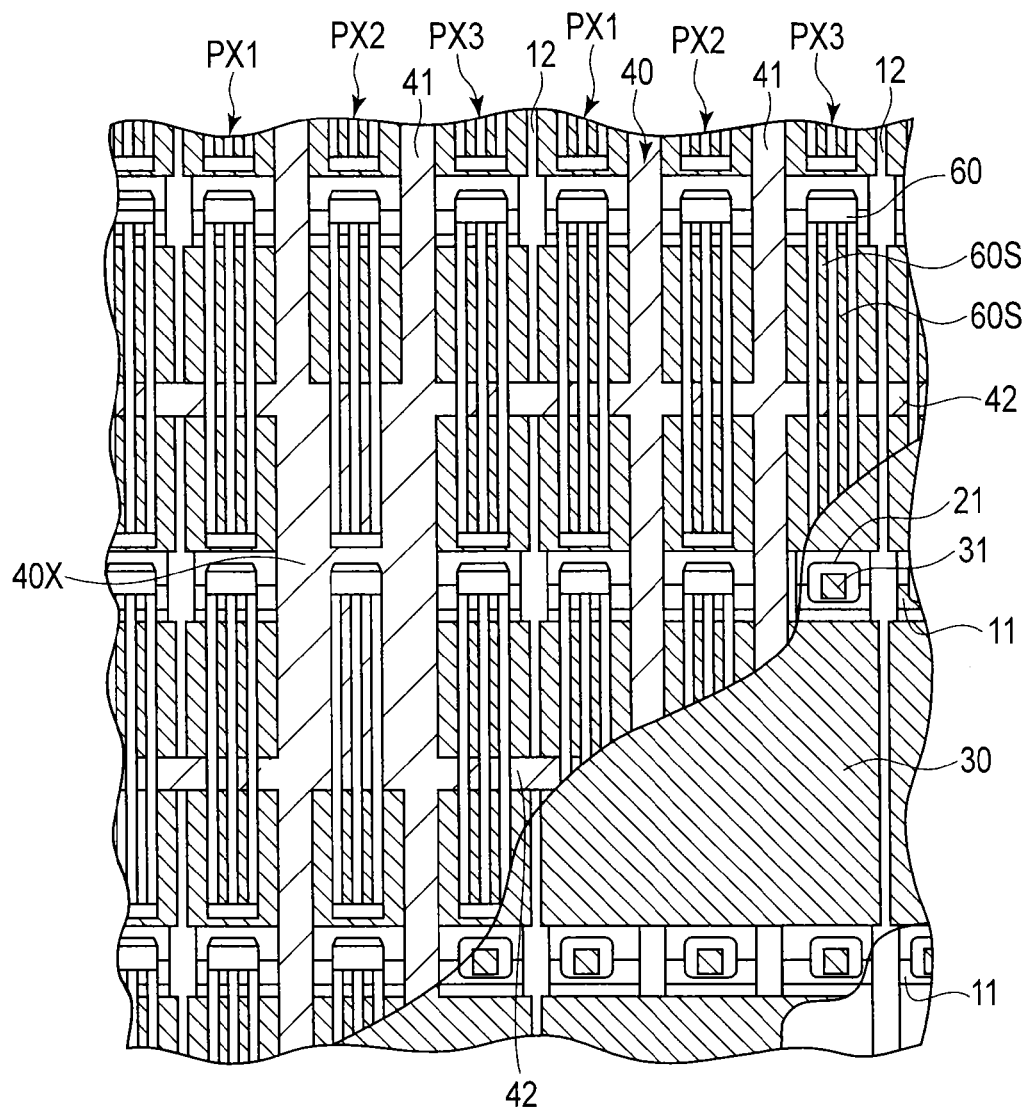
FIG. 5 is a plan view schematically showing an example of the arrangement of the display region of a liquid crystal display of a comparative example.

FIG. 5 schematically shows an example of the arrangement of the display region 25 of a liquid crystal display of a comparative example. In the liquid crystal display of the comparative example, the omitted portion 40A of the sensor electrode 40 is not formed. In this case, when an aluminum film is patterned by wet etching in forming the sensor electrodes 40, gas generated upon patterning readily stays in a region surrounded by a multilayered interconnection of an aluminum film and molybdenum film, and an exposure resist. The gas inhibits the etching solution from flowing onto the multilayered interconnection formed from the aluminum film and molybdenum film. The metal multilayer of the aluminum film and molybdenum film may remain unremoved at a portion from which the metal multilayer is tried to be removed by patterning.

As shown in FIG. 5, if the metal multilayer of the aluminum film and molybdenum film remains unremoved in the region surrounded by the sensor electrodes 40, it cuts off light in the display pixels PX, decreasing the opening ratio and degrading the display quality.

To the contrary, in the embodiment, the omitted portion 40A is formed in the sensor electrode 40 extending almost parallel to the signal line 12 between the second color pixel PX2 and the third color pixel PX3. The omitted portion 40A allows gas generated upon wet etching to move between the first region A1 and the second region A2. Since the gas does not stay, the flow of the etching solution is not inhibited by the gas, preventing generation of a patterning error in the metal layer formed from the aluminum film and the like.

After that, an exposure resist is applied to the sensor electrodes 40, exposed, and developed, forming an insulating film 50 having contact holes 51. A film of a transparent electrode material such as ITO is formed on the insulating film 50 and patterned into a predetermined pattern having slits 60S, thereby forming pixel electrodes 60. An alignment film having undergone rubbing processing in a predetermined direction is formed on the surfaces of the pixel electrodes 60.

Next, a method of forming the countersubstrate 120 will be explained. A colored exposure resist is repetitively applied, exposed, and developed on the second transparent insulating substrate for cutting out a plurality of countersubstrates 120, forming a first colored layer 24a, second colored layer 24b, third colored layer 24c, fourth colored layer 27a, and fifth colored layer 27b. A transparent resin material serving as the transparent resin planarization film 29 is applied to the plurality of colored layers, and patterned into a predetermined pattern, forming a transparent resin planarization film 29. Then, an alignment film having undergone rubbing processing in a predetermined direction is formed on the surface of the transparent resin planarization film 29.

Columnar spacers 22 are formed by applying, for example, a resin material to the first transparent insulating substrate or second transparent insulating substrate, and patterning it into a predetermined pattern.

Subsequently, a sealing agent 26 in the form of, for example, an ultraviolet curing resin is applied to the first transparent insulating substrate or second transparent insulating substrate to surround the display region 25. The transparent insulating substrate serving as a plurality of array substrates 110 and the transparent insulating substrate serving as a plurality of countersubstrates 120 are aligned to face each other. The sealing agent 26 is irradiated with ultraviolet rays and cured, fixing the transparent insulating substrates.

A liquid crystal material may be injected into the display region 25 from an injection port formed in the sealing agent 26. Alternatively, before adhering the first and second transparent insulating substrates, a liquid crystal material may be dropped into a region defined by the sealing agent 26. When a liquid crystal material is injected from the injection port, the injection port is sealed with a sealing agent after injection, forming a liquid crystal layer 70. When a liquid crystal material is dropped, the first and second transparent insulating substrates are adhered after dropping, forming a liquid crystal layer 70.

While the first and second transparent insulating substrates are adhered to each other, a plurality of array substrates 110, and portions of the second transparent insulating substrate that face the array substrates 110 are cut out. Further, the second transparent insulating substrate is cut into the countersubstrate 120.

Thereafter, polarizing plates are arranged on surfaces of the array substrate 110 and countersubstrate 120 that are opposite to the liquid crystal layer 70, forming a liquid crystal display.

As described above, in the liquid crystal display according to the embodiment, the omitted portion 40A is formed in the sensor electrode 40 to prevent gas generated in wet etching from staying in the first region A1 or second region A2. Since etching is performed satisfactorily, no unwanted pattern remains unremoved. A liquid crystal display including the high-quality sensor electrodes 40 at high yield can be provided.

That is, the embodiment can provide a high-display-quality liquid crystal display at high manufacturing yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
    a display region including a plurality of display pixels arrayed in a matrix;
    an array substrate including a plurality of first electrodes which are arrayed in a matrix, a plurality of first sensors which extend in a column direction on the first electrodes, and a plurality of second sensors which extend in a row direction substantially perpendicular to the column direction and are electrically connected to the first sensors;
    a countersubstrate which is arranged to face the array substrate; and
    a liquid crystal layer which is interposed between the array substrate and the countersubstrate,
    wherein the first sensors include omitted portions which connect adjacent regions surrounded by the first sensors and the second sensors,
    the first electrode is arranged to face a plurality of second electrodes, and
    the first sensors are interposed between the plurality of second electrodes facing the first electrode.

2. The device according to claim 1, wherein the second sensors arranged in columns of the display pixels adjacent to each other in the row direction are electrically connected to the first sensors at different positions in the column direction.

3. The device according to claim 2, wherein
    the second electrodes are arranged on an insulating layer on the first sensors and the second sensors to face the first electrodes, and
    the second electrodes include a plurality of slits extending substantially parallel to each other.

4. The device according to claim 1, wherein
    the second electrodes are arranged on an insulating layer on the first sensors and the second sensors to face the first electrodes, and
    the second electrodes include a plurality of slits extending substantially parallel to each other.

5. The device according to claim 1, wherein the first sensor and the second sensor are multilayered electrodes of molybdenum and aluminum.

6. The device according to claim 1, wherein the second sensors are arranged in every other row in columns of a plurality of the second electrodes aligned in the column direction.

7. The device according to claim 1, wherein the first sensors are arranged by two in three columns, adjacent in the row direction, of a plurality of the second electrodes aligned in the column direction.

8. A liquid crystal display comprising:
a array substrate including an organic insulating film, a plurality of first conductive oxide films which are arrayed in a matrix on the organic insulating film, a plurality of first sensors which extend in a first direction on the first conductive oxide films, a plurality of second sensors which extend in a second direction substantially perpendicular to the first direction and are electrically connected to the first sensors, an inorganic insulating film which is arranged on the first sensors and the second sensors, and second conductive oxide films which face the first conductive oxide films via the inorganic insulating film;
a countersubstrate which is arranged to face the array substrate; and
a liquid crystal layer which is interposed between the array substrate and the countersubstrate,
wherein the first sensors include omitted portions which connect adjacent regions surrounded by the first sensors and the second sensors.

9. The device according to claim 8, wherein the first sensor and the second sensor comprise multilayered electrodes of molybdenum and aluminum.

10. The device according to claim 8, wherein
the first electrode is arranged to face a plurality of second electrodes, and
the first sensors are interposed between the plurality of second electrodes facing the first conductive oxide films.

11. The device according to claim 8, wherein the second sensors are arranged in every other row in columns of a plurality of second electrodes aligned in the first direction.

12. The device according to claim 8, wherein the first sensors are arranged by two in three columns, adjacent in the second direction, of a plurality of second electrodes aligned in the first direction.

13. A liquid crystal display comprising:
a display region including a plurality of display pixels arrayed in a matrix;
an array substrate including a plurality of first electrodes which are arrayed in a matrix, a plurality of first sensors which extend in a column direction on the first electrodes, and a plurality of second sensors which extend in a row direction substantially perpendicular to the column direction and are electrically connected to the first sensors;
a countersubstrate which is arranged to face the array substrate; and
a liquid crystal layer which is interposed between the array substrate and the countersubstrate,
wherein the first sensors include omitted portions which connect adjacent regions surrounded by the first sensors and the second sensors, and
wherein the first sensors are arranged by two in three columns, adjacent in the row direction, of a plurality of second electrodes aligned in the column direction.

14. The device according to claim 13, wherein the second sensors arranged in columns of the display pixels adjacent to each other in the row direction are electrically connected to the first sensors at different positions in the column direction.

15. The device according to claim 14, wherein
the second electrodes are arranged on an insulating layer on the first sensors and the second sensors to face the first electrodes, and
the second electrodes include a plurality of slits extending substantially parallel to each other.

16. The device according to claim 13, wherein
the second electrodes are arranged on an insulating layer on the first sensors and the second sensors to face the first electrodes, and
the second electrodes include a plurality of slits extending substantially parallel to each other.

17. The device according to claim 13, wherein the first sensor and the second sensor are multilayered electrodes of molybdenum and aluminum.

18. The device according to claim 13, wherein the second sensors are arranged in every other row in columns of the plurality of second electrodes aligned in the column direction.

* * * * *